(12) United States Patent
Badding et al.

(10) Patent No.: US 11,777,145 B2
(45) Date of Patent: Oct. 3, 2023

(54) GEL COMPOSITE CATHODE FOR SOLID-STATE BATTERIES AND METHODS OF MANUFACTURING THEREOF

(71) Applicants: Corning Incorporated, Corning, NY (US); Shanghai Institute of Ceramics, Chinese Academy of Sciences, Shanghai (CN)

(72) Inventors: Michael Edward Badding, Campbell, NY (US); Mingli Cai, Shanghai (CN); Jun Jin, Shanghai (CN); Zhen Song, Painted Post, NY (US); Zhaoyin Wen, Shanghai (CN); Tongping Xiu, Shanghai (CN); Liu Yao, Shanghai (CN)

(73) Assignees: CORNING INCORPORATED, Corning, NY (US); Shanghai Institute of Ceramics Chinese Academy of Sciences, Shanghai (CN)

( * ) Notice: Subject to any disclaimer, the term of this patent is extended or adjusted under 35 U.S.C. 154(b) by 106 days.

(21) Appl. No.: 17/356,692

(22) Filed: Jun. 24, 2021

(65) Prior Publication Data
US 2021/0408591 A1  Dec. 30, 2021

(51) Int. Cl.
*H01M 10/0565* (2010.01)
*H01M 10/0585* (2010.01)
(Continued)

(52) U.S. Cl.
CPC ....... *H01M 10/0565* (2013.01); *H01M 4/131* (2013.01); *H01M 4/1391* (2013.01);
(Continued)

(58) Field of Classification Search
CPC ............ H01M 10/0565; H01M 4/131; H01M 4/1391; H01M 4/382; H01M 4/485;
(Continued)

(56) References Cited

U.S. PATENT DOCUMENTS 8,048,561 B2 * 11/2011 Zaghib ................... C01B 33/02
429/231.1
2020/0112050 A1 * 4/2020 Hu ..................... H01M 10/0525

FOREIGN PATENT DOCUMENTS

| CN | 2019/070810 A1 | 4/2019 |
| JP | 11-297357 A | 10/1999 |
| KR | 10-2018-0015841 A | 2/2018 |

OTHER PUBLICATIONS

Chi et al., "Solid Polymer Electrolyte Soft Interface Layer with 3d Lithium Anode for All-Solid-State Lithium Batteries", Energy Storage Mater. 2019, 17, pp. 309-316.
(Continued)

*Primary Examiner* — James M Erwin

(57) ABSTRACT

A battery includes a substrate; a composite cathode disposed on the substrate; a solid-state electrolyte disposed on the composite cathode; and a lithium anode disposed on the solid-state electrolyte, such that the composite cathode comprises a gel polymer electrolyte layer and a porous cathode active material layer. A method of forming a cathode for a solid-state battery includes mixing an active cathode material, at least one of a conductive carbon component and an electronic conductive component, and a polymer binder to form a slurry; immersing the slurry in an alcohol reagent to form a porous disc structure by phase conversion; and immersing the porous disc structure in a liquid electrolyte to form the cathode.

20 Claims, 5 Drawing Sheets

(51) Int. Cl.
  *H01M 10/0562* (2010.01)
  *H01M 4/62* (2006.01)
  *H01M 4/38* (2006.01)
  *H01M 4/525* (2010.01)
  *H01M 4/505* (2010.01)
  *H01M 4/485* (2010.01)
  *H01M 4/131* (2010.01)
  *H01M 4/1391* (2010.01)
  *H01M 10/052* (2010.01)
  *H01M 4/02* (2006.01)

(52) U.S. Cl.
  CPC ........... *H01M 4/382* (2013.01); *H01M 4/485* (2013.01); *H01M 4/505* (2013.01); *H01M 4/525* (2013.01); *H01M 4/625* (2013.01); *H01M 10/052* (2013.01); *H01M 10/0562* (2013.01); *H01M 10/0585* (2013.01); *H01M 2004/021* (2013.01); *H01M 2004/023* (2013.01); *H01M 2300/0071* (2013.01); *H01M 2300/0082* (2013.01); *H01M 2300/0085* (2013.01)

(58) Field of Classification Search
  CPC ...... H01M 4/505; H01M 4/525; H01M 4/625; H01M 10/052; H01M 10/0562; H01M 10/0585; H01M 2004/023
  USPC .......................................................... 429/162
  See application file for complete search history.

(56) References Cited

OTHER PUBLICATIONS

Fuming Du et al., "All Solid State Lithium Batteries Based on Lamellar Garnet-Type Ceramic Electrolytes", J. Power Sources 2015, 300, pp. 24-28.
Han et al., "Interphase Engineering Enabled All-Ceramic Lithium Battery", Joule 2018, 2 (3), 497-508.
He Minghui et al., "Construction of conductive and flexible composite cathodes for room-temperature solid-state lithium batteries" J. Alloys. Compd. 2018, 762, 157-162.
Jian-Fang Wu et al., "Garnet-Type Fast Li-Ion Conductors with High Ionic Conductivities for All-Solid-State Batteries", ACS Appl. Mater. Interfaces 2017, 9 (14), 12461-12468.
Liu et al., "Enhanced Electrochemical Performance of Bulk Type Oxide Ceramic Lithium Batteries Enabled by Interface Modification", J. Mater. Chem. A 2018, 6 (11), 4649-4657.
Liu Ting et al., "Achieving High Capacity in Bulk-Type Solid-State Lithium Ion Battery Based on Li 6.75 La 3 Zr 1.75 Ta 0.25 O 12 Electrolyte: Interfacial Resistance". J. Power Sources 2016, 324, 349-357.
Wang et al., "A Gel-Ceramic Multi-Layer Electrolyte for Long-Life Lithium Sulfur Batteries", Chem. Commun. 2016, 52 (8), 1637-1640.
Wang L. et al., "Ameliorating the Interfacial Problems of Cathode and Solid-State Electrolytes by Interface Modification of Functional Polymers", Adv. Energy Mater. 2018, 1801528(1-8).
Zhou et al., "Plating a Dendrite-Free Lithium Anode with a Polymer/Ceramic/Polymer Sandwich Electrolyte", J. Am. Chem. Soc 2016, 138 (30), 9385-9388.

\* cited by examiner

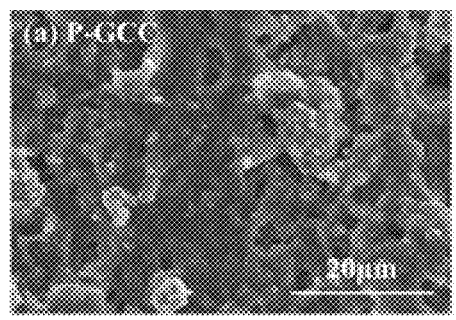
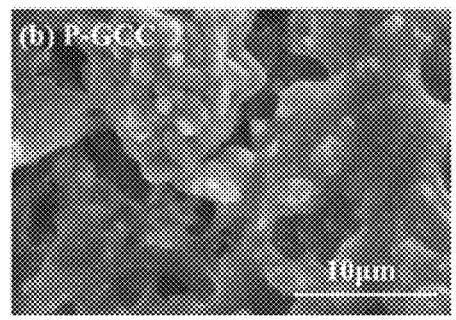
FIG. 3A
FIG. 3B
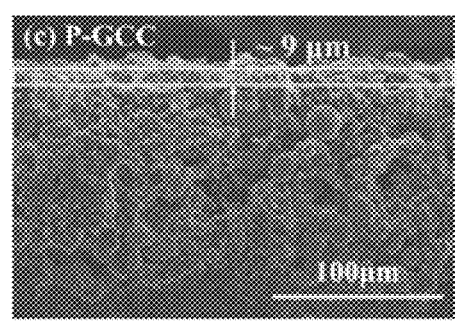
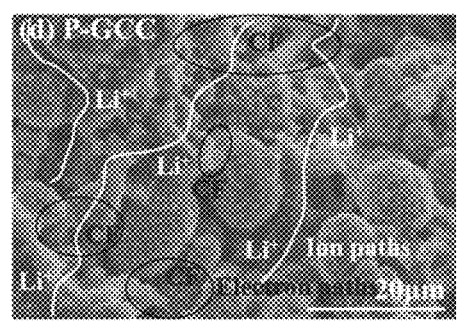
FIG. 3C
FIG. 3D
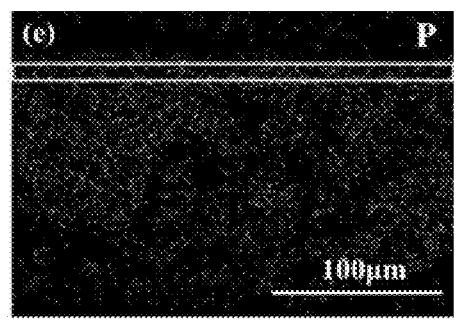
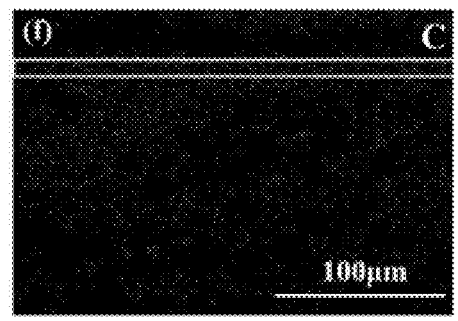
FIG. 3E
FIG. 3F

GEL COMPOSITE CATHODE FOR SOLID-STATE BATTERIES AND METHODS OF MANUFACTURING THEREOF

This application claims the benefit of priority under 35 U.S.C. § 119 of Chinese Patent Application Serial No. 202010590245.X, filed on Jun. 25, 2020, the content of which is relied upon and incorporated herein by reference in its entirety.

BACKGROUND

1. Field

This disclosure relates to gel composite cathodes for solid-state batteries and methods of manufacturing thereof.

2. Technical Background

Solid-state batteries (SSBs) (e.g., SS lithium (Li) metal batteries based on inorganic solid-state electrolytes (SSEs) (such as garnet-type SSE)) have attracted much attention due to their high safety, improved energy density, high ionic conductivity, and stability against Li metal.

However, conventional Li-metal batteries often suffer from high interfacial resistance between the cathode and solid-state electrolyte. Due to the rigid nature of the ceramic SSE, contact between active particles and the SSE is a "point-surface" contact, which leads to a limited contact area at the cathode-SSE interface and poor Li-ion ($Li^+$) accessibility inside the cathode.

To address these problematic issues, proposed solutions include employing a low melting compound (e.g., $Li_3BO_3$ (LBO), $Li_{2.3-x}C_{0.7+x}B_{0.3-x}O_3$ (LCBO), etc.) as a bonding material and Li-ion conductor to lower the cathode/SSE interfacial resistance. Additionally, a Li-ion conductive polymer-lithium salt in a polymer matrix ($Li(CF_3SO_2)_2N$ (LiTFSI) in poly(vinylidene fluoride) (PVDF), polyethylene oxide (PEO), polyethylene glycol) methyl ether acrylate (CPMEA), etc.) may be used to cushion the poor contact at cathode/SSE interface. However, the above-proposed configurations all exhibit low Li-ion conductivity, large impedance, and low current density at battery operating conditions.

The present application discloses improved cathodes and methods of formation thereof for solid-state battery applications.

SUMMARY

In some embodiments, a battery comprises: a substrate; a composite cathode disposed on the substrate; a solid-state electrolyte disposed on the composite cathode; and a lithium anode disposed on the solid-state electrolyte, wherein the composite cathode comprises a gel polymer electrolyte layer and a porous cathode active material layer.

In one aspect, which is combinable with any of the other aspects or embodiments, the porous cathode active material layer comprises at least one of $LiNi_dCo_eMn_{1-d-e}O_2$ (NCM) (with $0<d<1$, $0<e<1$), $LiT_MO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3 \cdot (1-y)LiXO_2$ (with X=Ni, Co, or Mn and $0<y\leq1$), $LiNi_{0.8}Co_{0.15}Al_{0.05}O_2$ (NCA), $LiNi_{0.5}Mn_{1.5}O_4$, $LiFePO_4$, or combinations thereof.

In one aspect, which is combinable with any of the other aspects or embodiments, the porous cathode active material layer comprises gel polymer electrolyte within its pores. In one aspect, which is combinable with any of the other aspects or embodiments, the gel polymer electrolyte layer has a thickness in a range of 0.01 μm to 50 μm. In one aspect, which is combinable with any of the other aspects or embodiments, the gel polymer electrolyte layer has a thickness in a range of 1 μm to 25 μm.

In one aspect, which is combinable with any of the other aspects or embodiments, the gel polymer electrolyte layer is in between the porous cathode active material layer and the solid-state electrolyte. In one aspect, which is combinable with any of the other aspects or embodiments, the gel polymer electrolyte layer is in contact with the solid-state electrolyte. In one aspect, which is combinable with any of the other aspects or embodiments, the porous cathode active material layer has a porosity of at least 50% and an average pore size diameter of at least 200 nm.

In one aspect, which is combinable with any of the other aspects or embodiments, the porous cathode active material layer has a porosity of at least 70% and an average pore size diameter of at least 400 nm. In one aspect, which is combinable with any of the other aspects or embodiments, the gel polymer electrolyte layer comprises: poly(vinylidene fluoride) (PVDF), poly(vinylidene fluoride)-hexafluoropropylene (PVDF-HFP), polyacrylic acid (PAA), polyacrylonitrile (PAN), polymethyl methacrylate (PMMA), polyvinyl formal (PVFM), polyvinyl butyral (PVB), polyvinyl alcohol (PVA), or combinations thereof. In one aspect, which is combinable with any of the other aspects or embodiments, the porous cathode active material layer comprises at least one of: a conductive carbon component, an electronic conductive component, or combinations thereof.

In one aspect, which is combinable with any of the other aspects or embodiments, the conductive carbon component and/or the electronic conductive component is independently selected from at least one of nanoparticles, nanowires, nanofibers, nanorods, nanotubes, nanospheres, graphene, carbon black, carbonized cotton fiber, Super P, Ketjen black, vapor grown carbon fiber (VGCF), or combinations thereof.

In one aspect, which is combinable with any of the other aspects or embodiments, the solid-state electrolyte comprises a compound having lithium, lanthanum, zirconium, and oxygen components. In one aspect, which is combinable with any of the other aspects or embodiments, the solid-state electrolyte comprises at least one of: (i) $Li_{7.3a}La_3Zr_2L_aO_{12}$, with L=Al, Ga or Fe and $0<a<0.33$; (ii) $Li_7La_{3-b}Zr_2M_bO_{12}$, with M=Bi or Y and $0<b<1$; (iii) $Li_{7-c}La_3(Zr_{2-c}, N_c)O_{12}$, with N=In, Si, Ge, Sn, V, W, Te, Nb, or Ta and $0<c<1$; or a combination thereof. In one aspect, which is combinable with any of the other aspects or embodiments, the solid-state electrolyte comprises $Li_{6.4}La_3Zr_{1.4}Ta_{0.6}O_{12}$ or $Li_{6.5}La_3Zn_{1.5}Ta_{0.5}O_{12}$.

In one aspect, which is combinable with any of the other aspects or embodiments, the solid-state electrolyte comprises at least one of: $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof.

In one aspect, which is combinable with any of the other aspects or embodiments, the battery is configured to exhibit at least one of: a capacity retention of at least 50% after 100 cycles; a cathode/SSE interfacial resistance of no more than 500 $\Omega cm^2$.

In some embodiments, a battery comprises a composite cathode; a solid-state electrolyte disposed on the composite cathode; and a lithium anode disposed on the solid-state electrolyte, wherein the battery has: a capacity retention of at least 50% after 100 cycles; and a cathode/SSE interfacial resistance of no more than 500 $\Omega cm^2$.

In one aspect, which is combinable with any of the other aspects or embodiments, the composite cathode comprises a gel polymer electrolyte layer and a porous cathode active material layer. In one aspect, which is combinable with any of the other aspects or embodiments, the porous cathode active material layer comprises gel polymer electrolyte within its pores; and the gel polymer electrolyte layer is in between the porous cathode active material layer and the solid-state electrolyte. In one aspect, which is combinable with any of the other aspects or embodiments, the gel polymer electrolyte layer has a thickness in a range of 1 μm to 25 μm. In one aspect, which is combinable with any of the other aspects or embodiments, the porous cathode active material layer has a porosity of at least 70% and an average pore size diameter of at least 400 nm.

In one aspect, which is combinable with any of the other aspects or embodiments, the gel polymer electrolyte layer comprises: poly(vinylidene fluoride) (PVDF), poly(vinylidene fluoride)-hexafluoropropylene (PVDF-HFP), polyacrylic acid (PAA), polyacrylonitrile (PAN), polymethyl methacrylate (PMMA), polyvinyl formal (PVFM), polyvinyl butyral (PVB), polyvinyl alcohol (PVA), or combinations thereof. In one aspect, which is combinable with any of the other aspects or embodiments, the solid-state electrolyte comprises at least one of: (i) $Li_{7-3a}La_3Zr_2L_aO_{12}$, with L=Al, Ga or Fe and 0<a<0.33; (ii) $Li_7La_{3-b}Zr_2M_bO_{12}$, with M=Bi or Y and 0<b<1; (iii) $Li_{7-c}La_3(Zr_{2-c}, N_c)O_{12}$, with N=In, Si, Ge, Sn, V, W, Te, Nb, or Ta and 0<c<1; or a combination thereof.

In some embodiments, a method of forming a cathode for a solid-state battery comprises: mixing an active cathode material, at least one of a conductive carbon component and an electronic conductive component, and a polymer binder in dipolar aprotic organic solvent to form a slurry; immersing the slurry in a non-solvent to form a porous disc structure by phase conversion; and immersing the porous disc structure in a liquid electrolyte to form the cathode.

In one aspect, which is combinable with any of the other aspects or embodiments, the active cathode material comprises at least one of: $LiNi_dCo_eMn_{1-d-e}O_2$ (NCM) (with 0<d<1, 0<e<1), $LiT_MO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3\cdot(1-y)LiXO_2$ (with X=Ni, Co, or Mn and 0<y≤1), $LiNi_{0.8}Co_{0.15}Al_{0.05}O_2$ (NCA), $LiNi_{0.5}Mn_{1.5}O_4$, $LiFePO_4$, or combinations thereof. In one aspect, which is combinable with any of the other aspects or embodiments, the conductive carbon component and/or the electronic conductive component is independently selected from at least one of nanoparticles, nanowires, nanofibers, nanorods, nanotubes, nanospheres, graphene, carbon black, carbonized cotton fiber, Super P, Ketjen black, vapor grown carbon fiber (VGCF), or combinations thereof.

In one aspect, which is combinable with any of the other aspects or embodiments, the polymer binder comprises at least one of: poly(vinylidene fluoride) (PVDF), poly(vinylidene fluoride)-hexafluoropropylene (PVDF-HFP), polyacrylic acid (PAA), polyacrylonitrile (PAN), polymethyl methacrylate (PMMA), polyvinyl formal (PVFM), polyvinyl butyral (PVB), polyvinyl alcohol (PVA), or combinations thereof. In one aspect, which is combinable with any of the other aspects or embodiments, the dipolar aprotic organic solvent comprises at least one of: N-methylpyrrolidone (NMP), N,N-dimethylformamide (DMF), dimethyl sulfoxide (DMSO), N,N-dimethylacetamide (DMAC), trimethyl phosphate (TMP), triethyl phosphate (TEP), or combinations thereof. In one aspect, which is combinable with any of the other aspects or embodiments, the non-solvent comprises at least one of: water, alcohol, methyl alcohol, isopropyl alcohol, glycerol, tetrahydrofuran (THF), or combinations thereof. In one aspect, which is combinable with any of the other aspects or embodiments, the liquid electrolyte comprises at least one of: $LiPF_6$, $LiBF_4$, $LiClO_4$, lithium chelatoborates, electrolyte additive agents, fluoroethylene carbonate (FEC), tris(trimethylsilyl)phosphate (TMSP), vinylene carbonate (VC), or combinations thereof. In one aspect, which is combinable with any of the other aspects or embodiments, a cathode is formed by any of the methods disclosed herein.

BRIEF DESCRIPTION OF THE DRAWINGS

The disclosure will become more fully understood from the following detailed description, taken in conjunction with the accompanying figures, in which:

FIGS. 3A to 3D illustrate SEM images of a gel composite cathode ('GCC'), according to some embodiments. FIGS. 3E and 3F illustrate elemental mapping of a porous cathode with specific structure ('P') and a common cathode without specific structure ('C'), respectively, according to some embodiments.

DETAILED DESCRIPTION

Figure 1:
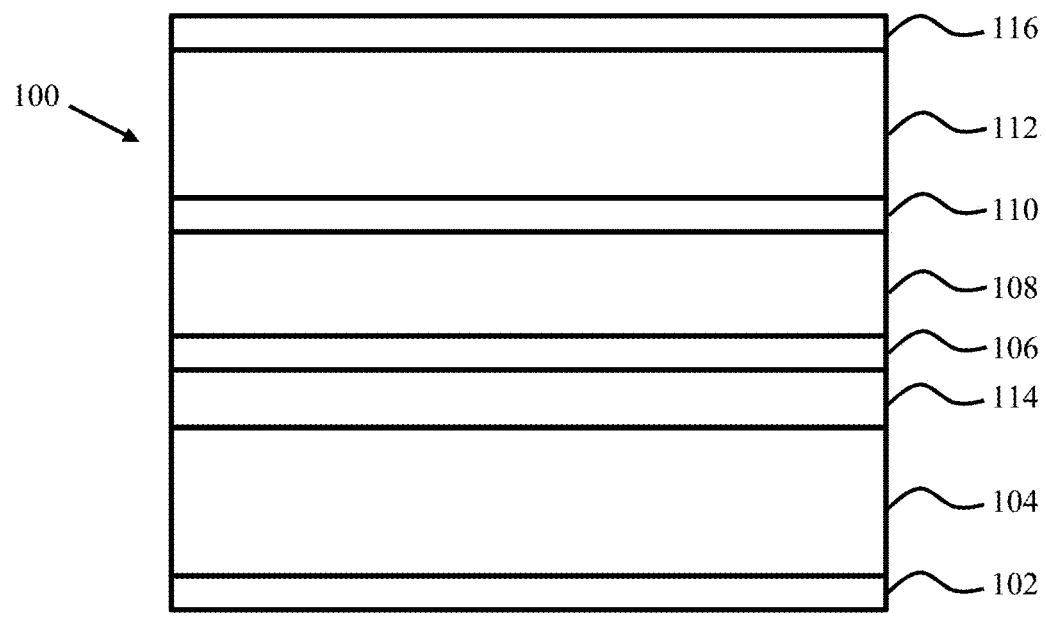
FIG. 1 illustrates a general structure of a solid-state battery, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Definitions

"LLZO" or like terms refer to compounds comprising lithium, lanthanum, zirconium, and oxygen elements. For example, lithium-garnet electrolyte comprises at least one of: (i) $Li_{7-3a}La_3Zr_2L_aO_{12}$, with L=Al, Ga or Fe and $0<a<0.33$; (ii) $Li_7La_{3-b}Zr_2M_bO_{12}$, with M=Bi or Y and $0<b<1$; (iii) $Li_{7-c}La_3(Zr_{2-c}, N_c)O_{12}$, with N=In, Si, Ge, Sn, V, W, Te, Nb, or Ta and $0<c<1$, or a combination thereof.

"Include," "includes," or like terms means encompassing but not limited to, that is, inclusive and not exclusive.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

For example, in modifying the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, "about" or similar terms refer to variations in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" (or similar terms) also encompasses amounts that differ due to aging of a composition or formulation with a particular initial concentration or mixture and amounts that differ due to mixing or processing a composition or formulation with a particular initial concentration or mixture.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Aimed at solving the problems defined above, one approach employs gel polymer electrolyte (GPE)-liquid electrolyte trapped in polymer matrix, which possesses high room temperature Li-ion conductivities and mechanical flexibility, as a feasible way to achieve relatively low interfacial resistance. For example, PEO-based GPE has been used as a buffer layer between the cathode and solid electrolyte as an attempt to reduce interfacial resistance and improve cycling performance at room temperature. However, one problem of such cell configurations is the relatively thick interlayer at the cathode-electrolyte interface and as a result, a lack of electrolyte inside the cathode. Thus, this approach is impractical.

The present disclosure relates to solid-state batteries comprising a gel composite cathode. More specifically, a gel composite cathode is disclosed comprising a porous structure with increased porosity (e.g., 75%), as compared with common cathode structures (about 60%), and larger pores comprising at least mixed active cathode material, electronic conductive material, and an ionic conductive gel polymer electrolyte skeleton. The GPE, with connected conductive materials (e.g., carbon), may also form an accumulated layer at a top surface of the composite cathode.

To construct this composite cathode, a porous structure of the cathode was made first, comprising a mixture of active material, electronic conductive material, and a polymer binder, with the polymer binder being allowed to also accrue to a predetermined thickness on a surface of the cathode. Thereafter, the polymer binder is combined with a liquid electrolyte to form the gel composite cathode. By designing the cathode structure, adjusting its composition, and choosing different polymers and their amounts, a thicker layer of polymer was formed on the cathode surface, allowing greater uptake of liquid electrolyte (i.e., a greater amount of liquid electrolyte may be combined with the polymer binder). As a result, the gel composite cathode is able to achieve a cathode/SSE interface with lower interfacial resistance (e.g., about 116 $\Omega cm^2$) and better solid-state battery performance (e.g., 0.4 mA $cm^{-2}$) at room temperature.

FIG. 1 illustrates a general structure of a solid-state battery, according to some embodiments. It will be understood by those of skill in the art that the processes described herein can be applied to other configurations of solid-state battery structures.

In some embodiments, battery 100 may include a substrate 102 (e.g., a current collector), an electrode (e.g., cathode) 104 disposed on the substrate, an optional coating layer 114 disposed on the cathode, an optional first interlayer 106 disposed on the coating layer, a solid-state electrolyte 108 disposed on the first interlayer, an optional second interlayer 110 disposed on the electrolyte, a lithium electrode (e.g., anode) 112 disposed on the second interlayer, and a second current collector 116 disposed on the anode. These can be disposed horizontally in relation to each other or vertically.

In some examples, the substrate 102 may a current collector including at least one of three-dimensional nickel (Ni) foam, carbon fiber, foils (e.g., aluminum, stainless steel, copper, platinum, nickel, etc.), or a combination thereof.

In some examples, the interlayer 106 and 110 may be independently chosen from at least one of carbon-based interlayers (e.g., interlinked freestanding, micro/mesopore containing, functionalized, biomass derived), polymer-based interlayers (e.g., polyethylene oxide (PEO), polypyrrole (PPY), polyvinylidene fluoride, etc.), metal-based (e.g., Ni foam, etc.), liquid electrolytes (e.g., $LiPF_6$ in ethylene carbonate (EC)/dimethyl carbonate (DMC)), ionic liquid-based (e.g., $LiCF_3SO_3/CH_3CONH_2$ or $PEO_{18}LiTFSI$-10%$SiO_2$-10% IL, the latter being a combination of PEO, bis(trifluoromethane) sulfonimide lithium salt (LiN$(CF_3SO_2)_2$, or LiTFSI), $SiO_2$ nanoparticles, and ionic liquid), or a combination thereof.

In some examples, solid-state electrolyte 108 may be used to address common safety concerns such as leakage, poor chemical stability, and flammability often seen in batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include compounds comprising lithium, lanthanum, zirconium, and oxygen elements, collectively "LLZO." For example, the solid-state, lithium-garnet electrolyte may comprise at least one of: (i) $Li_{7-3a}La_3Zr_2L_aO_{12}$, with L=Al, Ga or Fe and $0<a<0.33$; (ii) $Li_7La_{3-b}Zr_2M_bO_{12}$, with M=Bi or Y and $0<b<1$; (iii) $Li_{7-c}La_3(Zr_{2-c},N_c)O_{12}$, with N=In, Si, Ge, Sn, V, W, Te, Nb, or Ta and $0<c<1$ (e.g., $Li_{6.4}La_3Zr_{1.4}Ta_{0.6}O_{12}$ or $Li_{6.5}La_3Zn_{1.5}Ta_{0.5}O_{12}$, "LLZTO"); or a combination thereof.

In some examples, the solid-state electrolyte may include at least one of $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof. Methods of formation of the electrolyte 108 are described in the Examples below.

In some examples, the anode 112 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In some examples, a thin layer of metal (e.g., Au) may be ion-sputter coated to form a contact interface between the anode 112 and first interlayer 106 or between the anode and solid-state electrolyte 108. In some examples, a thin layer of silver (Ag) paste may be brushed to a surface of the solid-state electrolyte 108 to form a close contact between the anode 112 and solid-state electrolyte 108.

In some examples, the coating layer 114 may comprise at least one of carbon polysulfides (CS), polyethylene oxides (PEO), polyaniline (PANI), polypyrrole (PPY), polype-ethyl enedioxy thiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof, and at least one lithium salt (e.g., bis(trifluoromethane) sulfonimide lithium salt ($LiN(CF_3SO_2)_2$)(LiTFSI), lithium perchlorate, lithium bis(oxalato) borate (LiBOB), lithium bis(fluorosulfonyl)imide (LiFSI), lithium trifluoromethanesulfonate ($LiCF_3SO_3$) (LiTf), lithium bis(trifluoromethanesulfonimide) ($Li(C_2F_5SO_2)_2N$) (LiBETI), or combinations thereof). In some examples, the coating layer may additionally comprise at least one of, or at least two of, or at least three of nitrogen, carbon, cobalt, titanium, tantalum, and tungsten.

Description of the cathode 104 and methods of formation are described in the Examples below.

EXAMPLES

A two-step process is used for constructing this cathode: (1) casting to form a polymer/cathode/carbon fiber film with porous structure, whereby utilizing sufficient polymer creates a layer of the polymer on top of the film; and (2) soaking the film in liquid electrolyte to allow the polymer to form the gel polymer electrolyte. Further explanation is provided below.

Example 1—Preparation of Garnet-Type Solid State Electrolyte

LLZTO is synthesized and sintered into ceramic pellets by traditional solid phase methods, such as high temperature solid-state reaction methods. LiOH $H_2O$ (AR), $La_2O_3$ (99.99%), $ZrO_2$ (AR) and $Ta_2O_5$ (99.99%) are mixed by ball milling in a stoichiometric ratio with 10 wt. % excess of LiOH $H_2O$. The dry $La_2O_3$ powder is obtained by heating at 900° C. for 12 hrs. The powder mixture is calcined at 950° C. for 6 hrs in an alumina crucible to obtain a cubic phase LLZTO powder, which is then ball milled at 250 rpm for 24 hrs to obtain refined powder. The prepared LLZTO refined powder is then pressed and calcined at 1250° C. for 30 min in a platinum crucible in air. The pellets are polished and stored in an Ar-filled glove box. The final ceramic pellets are about 1.0 mm thick and about 13.5 mm in diameter.

Example 2—Preparation of Gel Composite Cathode

A $LiNi_dCo_eMn_{1-d-e}O_2$ (NCM), (with $0<d<1$, $0<e<1$) (e.g., $LiNi_{0.5}Co_{0.2}Mn_{0.3}O_2$, NCM523) cathode was prepared by slurry coating technique. A NCM523 powder (active cathode material), super P carbon powder (conductive carbon component), vapor grown carbon fiber (VGCF) (electronic conductive material), and poly(vinylidene fluoride) (PVDF) or poly(vinylidene fluoride)-hexafluoropropylene (PVDF-HFP) (polymer binder, "polymer phase") is mixed at a weight ratio of (A) 16:1:1:2 or (B) 35:3:3:9 in dipolar aprotic organic solvent (e.g., N-methylpyrrolidone (NMP), "solvent phase") by ball milling for 6 hrs to form a slurry.

In some examples, the polymer binder comprises at least one of: poly(vinylidene fluoride) (PVDF), poly(vinylidene fluoride)-hexafluoropropylene (PVDF-HFP), polyacrylic acid (PAA), polyacrylonitrile (PAN), polymethyl methacrylate (PMMA), polyvinyl formal (PVFM), polyvinyl butyral (PVB), polyvinyl alcohol (PVA), or combinations thereof. In some examples, the mixture comprises at least one of a conductive carbon component, an electronic conductive component, or combinations thereof. In some examples, the conductive carbon component and/or the electronic conductive material is independently selected from at least one of nanoparticles, nanowires, nanofibers, nanorods, nanotubes, nanospheres, graphene, carbon black, carbonized cotton fiber, Super P, Ketjen black, vapor grown carbon fiber (VGCF), or combinations thereof. The conductive carbon component and/or the electronic conductive material provide electronic conductivity and ensure good rate capability.

In some examples, the active cathode material is contemplated as being $LiNi_dCo_eMn_{1-d-e}O_2$ (NCM) (with $0<d<1$, $0<e<1$), $LiT_MO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3 \cdot (1-y)LiXO_2$ (with X=Ni, Co, or Mn and $0<y\le1$), $LiNi_{0.8}Co_{0.15}Al_{0.05}O_2$ (NCA), $LiNi_{0.5}Mn_{1.5}O_4$, $LiFePO_4$, or combinations thereof. Active cathode materials provide capacity of the battery. In some examples, the dipolar aprotic organic solvent comprises at least one of: N-methylpyrrolidone (NMP), N,N-dimethylformamide (DMF), dimethyl sulfoxide (DMSO), N,N-dimethylacetamide (DMAC), trimethyl phosphate (TMP), triethyl phosphate (TEP), or combinations thereof. The binder maintains the stability of the electrode structure and prevents the electrode from collapsing and peeling off during the cycling.

In some examples, a weight ratio of active cathode material is in a range of 50% to 95%, a weight ratio of conductive component (e.g., sum of conductive carbon component and electronic conductive material) is in a range of 3% to 30%, and the weight ratio of polymer binder is in a range of 3% to 30%. In some examples, a weight ratio of active cathode material is in a range of 60% to 90%, a weight ratio of conductive component is in a range of 5% to 25%, and a weight ratio of polymer binder is in a range of 5% to 25%. In some examples, a weight ratio of active cathode material is in a range of 70% to 85% (e.g., 70%, 80%, etc.), a weight ratio of conductive component is in a range of 8% to 20% (e.g., 10%, 12%, etc.), and a weight ratio of polymer binder is in a range of 8% to 20% (e.g., 10%, 18%, etc.). In some examples, the solid content of the slurry (i.e., ratio of the sum of the mass of active cathode material, conductive carbon component and/or electronic conductive component, and polymer binder to the total mass of the slurry), is in a range of 20% to 40%.

After mixing, the slurry is coated on an aluminum foil by blade casting and then directly immersed in a non-solvent (e.g., an alcohol) for about one minute. The alcohol dissolves with NMP and forms a porous cathode structure by phase conversion, in which the anhydrous alcohol is used as a non-solvent. As the slurry-coated foil is immersed into the non-solvent phase, the alcohol gradually permeates into the slurry, first forming an alcohol-polymer-solvent solution and then breaking the thermodynamic equilibrium to form two phases: a polymer-rich phase (mainly binder, active material, and conductive component) and a polymer-poor phase (mainly solvent NMP). The polymer-rich phase solidifies as the skeleton of porous electrodes, while the polymer-poor phase become the pores. The solvent-non-solvent exchange process immediately occurs on a slurry/alcohol interface, which forms the porous skin layer. Below the skin layer, the exchange rate between solvent and non-solvent is much slower, and droplets of polymer-poor phase may aggregate and grow, forming the porous support layer with continuous pores.

The coated cathode is taken out and dried at room temperature for about five minutes, followed by continuously drying under vacuum (at 50° C. to 100° C. (e.g., 65° C.) for 1 hr to 48 hrs (e.g., 24 hrs)). The obtained cathode was cut into 12 mm diameter ($\Phi$) discs. Thus, in this first step of the cathode forming process, a polymer/cathode/carbon fiber film is formed with sufficient polymer to create a layer of the polymer on top of the film. In some examples, the non-solvent comprises at least one of: water, alcohol, methyl alcohol, isopropyl alcohol, glycerol, tetrahydrofuran (THF), or combinations thereof.

Thereafter, the cathode discs are immersed in a liquid electrolyte (e.g., 1M $LiPF_6$ in EC/DMC/DEC) for 6 hrs in an argon-filled glove-box. In this cathode, the binder (PVDF or PVDF-HFP) functions as a matrix of the gel electrolyte that absorbs the liquid electrolyte in this soaking process. Liquid electrolyte absorbs into micropores of the polymer, and the amorphous region of the polymer matrix swells due to liquid electrolyte absorption to form the gel. In some examples, the liquid electrolyte may comprise $LiPF_6$, $LiBF_4$, $LiClO_4$, lithium chelatoborates (e.g., lithium bis(oxalato)borate), electrolyte additive agents, fluoroethylene carbonate (FEC), tris(trimethylsilyl)phosphate (TMSP), vinylene carbonate (VC), or combinations thereof, in an organic solvent.

After removing the soaked cathodes from the liquid electrolyte solution, they are dried to remove extra liquid electrolyte. Thus, in this second step of the cathode forming process, the polymer/cathode/carbon fiber film is soaked in liquid electrolyte to allow the polymer to form a gel polymer electrolyte, and as a result, the gel composite cathode.

In some embodiments, the gel composite cathode has a porosity of at least 10%, or at least 20%, or at least 30%, or at least 40%, or at least 50%, or at least 60%, or at least 70% (e.g., 75%), or at least 80%, or at least 90%, or at least 95%, or any value or range disclosed therein. In some embodiments, the gel composite cathode has an average pore size diameter of at least 200 nm, or at least 300 nm, or at least 400 nm, or at least 500 nm, or at least 600 nm, or at least 700 nm, or at least 800 nm, or at least 900 nm, or at least 1000 nm, or at least 1200 nm, or at least 1500 nm, or any value or range disclosed therein. In some embodiments, the gel composite cathode has an average pore size diameter in a range of 400 nm to 1200 nm, or 400 nm to 1000 nm, or 400 nm to 800 nm, or 400 nm to 700 nm, or 400 nm to 600 nm, or any value or range disclosed therein.

Example 3—Assembly of Solid-State Battery for Testing

Assembly of solid-state batteries matched with NCM523 gel composite cathode is completed by melting a fresh Li foil (anode) on polished solid-state electrolyte prepared in Example 1 and then positioning the Li-electrolyte stack on the gel composite cathode prepared as in Example 2. All cells were assembled in CR2025 coin cells. Example 3 was performed in an argon-filled glove-box. The SSE may be polished using silicon carbide (SiC) sandpaper. Melting of the fresh Li foil may be conducted at a temperature in a range of 250° C. to 400° C. (e.g., 300° C. to 350° C.) for a time in a range of 1 sec to 20 min (e.g., 3 min to 10 min), followed by naturally cooling to room temperature.

In some examples, the heating is conducted at a temperature in the range of 250° C. to 400° C., or 275° C. to 375° C., or 300° C. to 350° C. (e.g., 340° C.), or 250° C. to 300°

C., or 350° C. to 400° C., or any value or range disclosed therein. In some examples, the time is conducted in the range of 1 sec to 20 min, or 30 sec to 15 min, or 1 min to 10 min, or 3 min to 10 min, or 5 min to 10 min, or any value or range disclosed therein.

Sealing pressure of the coin cell is in a range of 1 MPa to 10 MPa (e.g., ~5 MPa).

In some examples, the formed battery exhibits an impedance below 250 $\Omega \cdot cm^2$, or below 225 $\Omega \cdot cm^2$, or below 200 $\Omega \cdot cm^2$, or below 175 $\Omega \cdot cm^2$, or below 150 $\Omega \cdot cm^2$, or below 125 $\Omega \cdot cm^2$, or below 100 $\Omega \cdot cm^2$, or below 75 $\Omega \cdot cm^2$, or below 50 $\Omega \cdot cm^2$, or below 25 $\Omega \cdot cm^2$, or below 10 $\Omega \cdot cm^2$, or below 5 $\Omega \cdot cm^2$, or any value or range disclosed therein. In some examples, the formed battery exhibits a reversible capacity of at least 80 mAh $g^{-1}$, or at least 100 mA/hgs$^1$, or at least 120 mAh $g^{-1}$, or at least 150 mAh $g^{-1}$, or at least 180 mAh $g^{-1}$, or at least 200 mAh $g^{-1}$, or any value or range disclosed therein, at first cycle. In some examples, batteries with cathodes described herein exhibit an initial discharge capacity of about 160 mAh $g^{-1}$. In some examples, the formed battery exhibits a capacity retention of at least 40%, or at least 50%, or at least 60%, or at least 70%, or at least 80%, or at least 90%, or at least 95%, or at least 99%, or any value or range disclosed therein, after 100 cycles. In some examples, the formed battery exhibits a cathode/SSE interfacial resistance of no more than 500 $\Omega cm^2$, or no more than 250 $\Omega cm^2$, or no more than 100 $\Omega cm^2$, or any value or range disclosed therein.

Example 4—Characterization Techniques

Morphology and Element Distribution Measurements

Microstructure images are captured by scanning electron microscope (SEM, Hitachi JSM 6700). Element mapping images are characterized by an energy dispersive spectrometer (EDS) affiliated with the HITACHI SEM.

Electrochemical Measurements

Electrochemical impedance spectroscopy (EIS) measurements are conducted by alternating current (AC) impedance analysis (Autolab, Model PGSTAT302N Netherland) with a frequency range of 0.1 Hz to $10^5$ Hz and an AC amplitude of 10 mV.

All assembled batteries are tested on a battery test system (NEWARE BTS-4000) in a voltage range of from 2.8V to 4.5V at room temperature.

Example 5—Sample Preparation and Characterization

Sample 1

The GCC of Sample 1 is prepared as described above in Example 2 using NCM523 active cathode material powder, super P conductive carbon component, VGCF electronic conductive material, and PVDF polymer binder in weight ratio of 16:1:1:2. The SSB used for testing is prepared as described in Example 3.

Sample 2

Sample 2 is prepared the same as Sample 1, except a PVDF-HFP polymer binder is used.

Sample 3

Sample 3 is prepared the same as Sample 1, except with a weight ratio of 35:3:3:9.

Sample 4

Sample 4 is prepared the same as Sample 3, except a PVDF-HFP polymer binder is used.

Comparative Sample 1

Comparative Sample 1 is prepared the same as Sample 1, except that after coating on Al foil, the slurry is not directly immersed in absolute alcohol.

Comparative Sample 2

Comparative Sample 2 is prepared the same as Comparative Sample 1, except a PVDF-HFP polymer binder is used.

Characterization

Figure 2A:
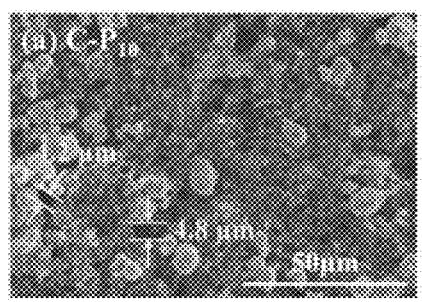
FIGS. 2A to 2I illustrate scanning electron microscopy (SEM) images of cathodes having different structures, according to some embodiments. Representations include: 'C,' a common cathode without specific structure; 'P,' a porous cathode with specific structure; '$P_{10}$,' a porous cathode with 10 wt % PVDF; '$PH_{10}$,' a porous cathode with 10 wt % PVDF-HFP; '$P_{18}$,' a porous cathode with 18 wt % PVDF; and '$PH_{18}$,' a porous cathode with 18 wt % PVDF-HFP.
Figure 2B:
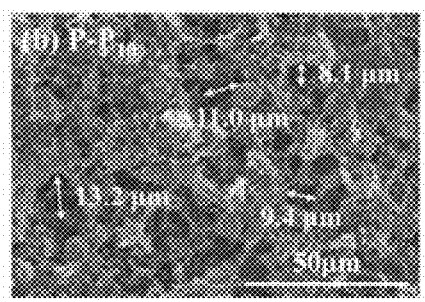
Figure 2C:
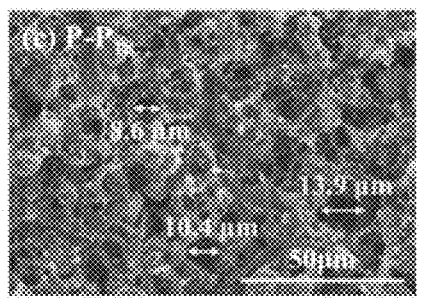
Figure 2D:
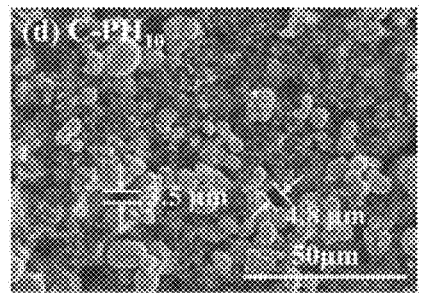

FIGS. 2A to 2I illustrate SEM images of cathodes having different structures, according to some embodiments. Specifically, FIGS. 2A and 2D are surface SEM images from the common cathode comprising 10 wt. % PVDF polymer binder (Comparative Sample 1) and 10 wt. % PVDF-HFP polymer binder (Comparative Sample 2), respectively. In each instance, a similar structure was observed having a pore size roughly on the order of about 4 µm, as the polymer binder forms a relatively dense affiliation with the NCM particles (which are randomly dispersed inside the cathode) directly exposed to the surface. Cathodes are prepared by direct drying, which creates a time gap for removing NMP due to its high boiling point. In this process, the polymer settles with the particles, forming a relatively dense structure and small pores. Though their functions are similar in their use as binders, PVDF and PVDF-HFP may bond active particles, conductive materials and the current collector; differences may be observed in battery cycling.

Figure 2E:
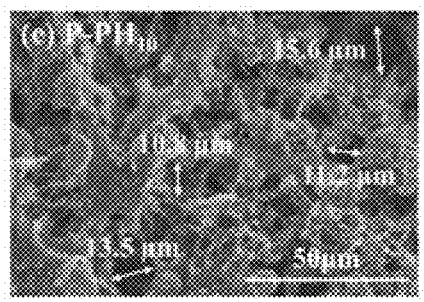

FIGS. 2B and 2E are surface SEM images of the porous cathode comprising 10 wt. % PVDF polymer binder (Sample 1) and 10 wt. % PVDF-HFP polymer binder (Sample 2), respectively. In comparison with Comparative Sample 1 (FIG. 2A) and Comparative Sample 2 (FIG. 2D), respectively, a much larger pore size is observed. In each of Samples 1 and 2, a three-dimensional electron channel inside the cathode is seen with larger pores, reaching up to over 15 µm. The polymer binder connects NCM particles with conductive carbon. At 1000× magnification, most of the particles are covered by polymers. Alcohol gradually permeates into the cathode slurry, first forming an alcohol-polymer-NMP solution, and then breaking a thermodynamic equilibrium to form two phases: the polymer-rich phase (mainly binder and active material/conductive component) and the polymer-poor phase (mainly NMP). The polymer-rich phase solidifies as the skeleton of porous cathode, while the polymer-poor phase becomes the pores in the exchange of NMP and alcohol. Table 1 describes the porosity and average pore diameter of samples tested herein.

TABLE 1

| Sample | Binder | Porosity | Average Pore Diameter |
| --- | --- | --- | --- |
| Comparative Sample 1 | PVDF-10 wt % | ~60% | 229.5 nm |
| Sample 1 | PVDF-10 wt % | ~70% | 564.5 nm |
| Sample 2 | PVDF-HFP-10 wt % | 75% | 419.5 nm |
| Sample 4 | PVDF-HFP-18 wt % | 75% | 496.5 nm |

The SEM images of FIGS. 2A-2I show estimated diameters of apparent macropores, with several smaller pores provided therein. The average pore diameter of the cathode disclosed herein is on the order of hundreds of nanometers. By mercury porosimetry tests, the average pore diameter of porous cathodes is at least 400 nm, which is larger than that of the common cathode (~220 nm). These values are shown in Table 1.

Figure 2F:
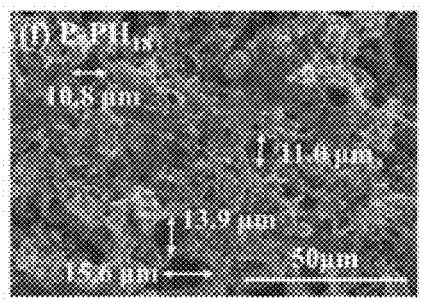

FIGS. 2C and 2F are surface SEM images of the porous cathode comprising 18 wt. % PVDF polymer binder (Sample 3) and 18 wt. % PVDF-HFP polymer binder (Sample 4), respectively. With increased amount of polymer, the solid content of cathode slurry is decreased to obtain a similar structure (e.g., from 32 wt % to 28 wt %). Thus the polymer binder concentration affects pore size.

Figure 2G:
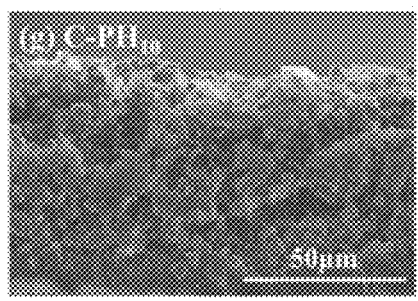
Figure 2H:
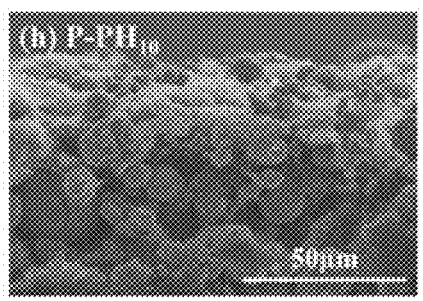
Figure 2I:
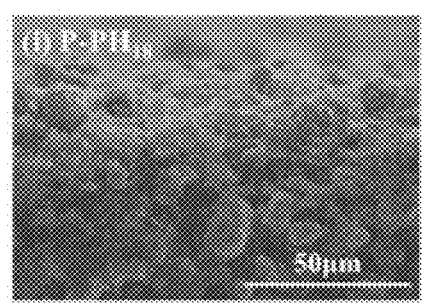

FIGS. 2G to 2I are cross-sectional SEM images of the common cathode comprising 10 wt. % polymer binder, porous cathode comprising 10 wt. % polymer binder, and porous cathode comprising 18 wt. % polymer binder, respectively. For samples with higher concentrations of polymer binder (i.e., FIG. 2I), a thicker layer of polymer is seen on the cathode surface. FIG. 2G and FIG. 2H both show a portion of NCM particles exposed to the surface without polymer coating. Thus, the thickness of the polymer on the surface of the samples is not compared, only whether the surface is completely covered by the polymer is compared. For example, from FIGS. 2H and 2I, an overflow of polymer is observed on both surfaces. However, FIG. 2H (Sample 2) shows a portion of NCM particles exposed to the surface without polymer coating (bare NCM particles) while FIG. 2I (Sample 4) shows complete coverage of the NCM particles exposed to the surface with a layer of polymer. This indicates that Sample 4 contains a more desired cathode structure having increased porosity with the gel polymer contained therein, while also having the electronic and ionic conductive gel polymer covering the entire cathode surface.

As explained above, after the porous cathode samples (i.e., Samples 1-4) are soaked (immersed) in liquid electrolyte, the polymer binder functions as a matrix of the gel electrolyte to which the liquid electrolyte binds, allowing the polymer to form a gel polymer electrolyte, and as a result, a gel composite cathode. FIGS. 3A to 3D (Sample 4) illustrate SEM images of a gel composite cathode (GCC), according to some embodiments. FIGS. 3E and 3F illustrate elemental mapping of a porous cathode with specific structure ('P') and a common cathode without specific structure ('C'), respectively, according to some embodiments.

Specifically, FIGS. 3A and 3B represent surface images of the GCC at different magnifications. At lower magnifications (FIG. 3A, 2000×), it is observed that liquid electrolyte binds to the polymer binder portion of the cathode, while at higher magnifications (FIG. 3B, 5000×), it is observed that the gel electrolyte combines with the vapor grown carbon nanofibers connected with NCM active cathode material particles, to form three-dimensional ionic/electronic pathways, which are pointed out in FIG. 3D (CF indicates carbon fiber).

FIGS. 3C (500×) and 3D (2000×) represent cross-sectional images of the GCC at different magnifications. At higher magnifications (FIG. 3D), structure of the gel electrolyte combined with conductive VGCF (which connect NCM active cathode material particles) is observed. The P element map of FIG. 3E indicates the degree to which liquid electrolyte penetrates into the cathode bulk and the gel polymer location, while the C element of FIG. 3F indicates existence of conductive carbon.

For example, FIG. 3E clearly shows that gel polymer electrolyte is concentrated on a surface of the cathode, confirming the successful construction of a thin gel layer on top of the cathode surface. Combining the images of FIGS. 3C, 3E, and 3F, it is determined that the constructed gel polymer electrolyte layer is approximately 9 μm thick and is a mixed electronic and ionic conductor due to the presence of lithium salt and conductive carbon. The maps also indicate that polymer binder matrix is able to trap liquid electrolyte inside the cathode bulk because crosslinked ion paths are formed therein, which is favorable for reducing the cathode/SSE interfacial resistance. In some embodiments, a thickness of the gel polymer electrolyte layer on top of the cathode surface is in a range of 0.01 μm to 50 μm, or 1 μm to 25 μm, or 5 μm to 15 μm (e.g., 9 μm), or 0.01 μm to 5 μm, or 5 μm to 10 μm, or 10 μm to 25 μm, or 25 μm to 50 μm, or any value or range disclosed therein.

Figure 4A:
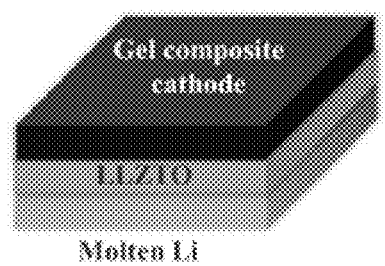
FIG. 4A illustrates a schematic diagram of a full battery based on a GCC and SSE pellet (e.g., LLZTO), according to some embodiments.
Figure 4B:
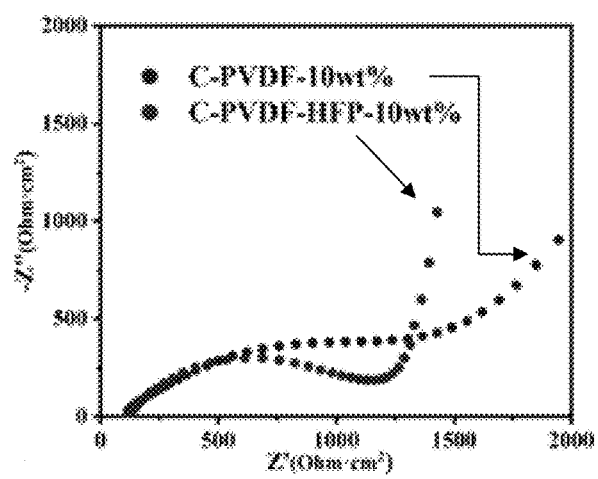
FIGS. 4B to 4D illustrate electrochemical impedance spectroscopy (EIS) spectra of full batteries of the form in FIG. 4A with varying cathode structures, according to some embodiments. Representations for 'C' and 'P' are described above.
Figure 4C:
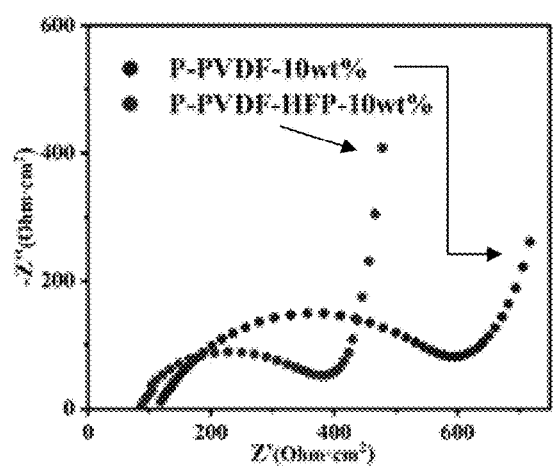
Figure 4D:
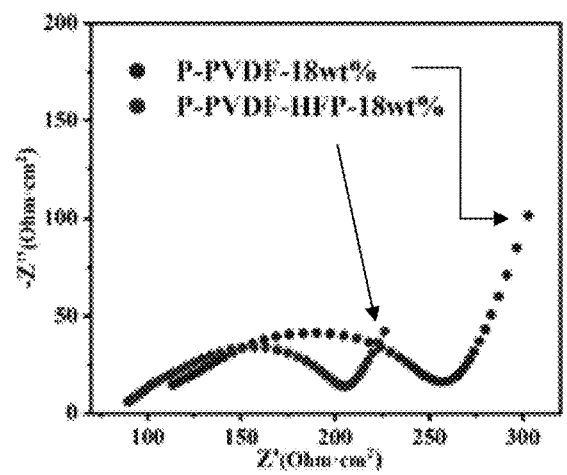

FIG. 4A illustrates a schematic diagram of a full battery based on a GCC and LLZTO SSE pellet. FIGS. 4B to 4D illustrate electrochemical impedance spectroscopy (EIS) spectra of full batteries of the form in FIG. 4A with varying cathode structures and polymers. Batteries with PVDF-HFP all have smaller impedance than cells with an equivalent amount of PVDF. Cathode/SSE interfacial resistance values are listed in the Table 2. Thus, cathodes with porous structures comprising increased amounts of polymers are favorable for lower interfacial resistance.

TABLE 2

| Sample | Binder | Solid Content of Slurry | Mass, Pre-Liquid Electrolyte Uptake (mg) | Mass, Post-Immersing in Liquid Electrolyte for 6 hrs (mg) | Liquid Uptake (mg) | Cathode/SSE interfacial resistance ($\Omega$ cm$^2$) |
|---|---|---|---|---|---|---|
| Comparative Sample 1 | PVDF-10 wt % | 32 wt % | 8.0 | 12.8 | 4.8 | 1385 |
| Comparative Sample 2 | PVDF-HFP-10 wt % | 32 wt % | 8.2 | 13.8 | 5.6 | 1035 |
| Sample 1 | PVDF-10 wt % | 32 wt % | 8.0 | 15.0 | 7.0 | 480 |
| Sample 2 | PVDF-HFP-10 wt % | 32 wt % | 8.2 | 16.6 | 8.4 | 295 |
| Sample 3 | PVDF-18 wt % | 28 wt % | 8.0 | 18.4 | 10.4 | 145 |
| Sample 4 | PVDF-HFP-18 wt % | 28 wt % | 8.2 | 20.8 | 12.6 | 116 |

Table 2 lists the liquid electrolyte uptake (i.e., within pores of the cathode as a resulting of immersed in a liquid electrolyte) and values for the cathode/SSE interfacial resistance in Comparative Samples 1 and 2 (i.e., which have a non-porous bulk resulting from not immersing its slurry in absolute alcohol to form a porous cathode structure by phase conversion) and Samples 1-4. Comparative Samples 1 and 2 contained less liquid electrolyte within the cathode bulk due to their non-porous structures and as a result, the resultant cathode/SSE interfacial resistance within the assembled test cell (i.e., see FIG. 4A) was over 1000 $\Omega$cm$^2$. In comparison, Samples 1-4 exhibited a cathode/SSE interfacial resistance of less than half (less 500 $\Omega$cm$^2$).

This indicates that the designed structure of Samples 1-4—having a combination of (1) increased porosity through the cathode bulk and (2) an accumulated polymer layer at the cathode surface—is favorable for intaking greater quantities of liquid electrolyte, and thus achieving better cathode/SSE interfaces (lower resistances) than their Comparative Sample counterparts. Moreover, cathodes with PVDF-HFP polymer binders (Comparative Sample 2 and Samples 2 and 4) retain more liquid electrolyte and exhibit lower cathode/SSE interfacial resistances than cathodes with the same amount of polymer, but in PVDF form (Comparative Sample 1 and Samples 1 and 3, respectively). Without being bound by theory, it is believed that PVDF-HFP's lower crystallinity than PVDF allows for greater pore formation and larger free volume. Liquid electrolyte uptake also increases with greater availability of the polymer. For example, with increased polymer binder concentration (Samples 3 and 4), liquid electrolyte uptake is enhanced, thereby greatly reducing the cathode/SSE interfacial resistance at room temperature to about 145 $\Omega cm^2$ (Sample 3) and about 116 $\Omega cm^2$ (Sample 4). These results confirm that with the right polymer, polymer concentration, and cathode porosity the designed cathode can effectively lower the cathode/SSE interfacial resistance.

Figure 5A:
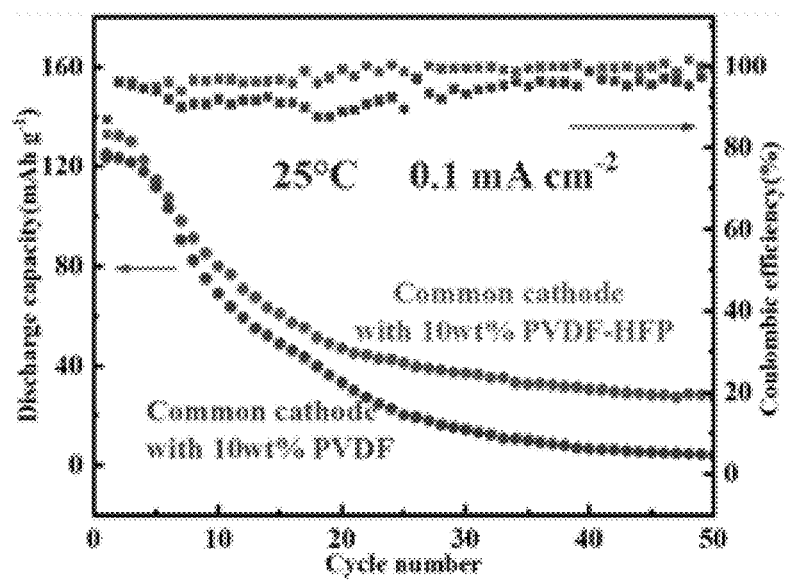
FIGS. 5A and 5B illustrate the cycling performance of solid batteries based on GCCs with a common cathode at 0.1 mA $cm^{-2}$ (FIG. 5A) and with a porous cathode at 0.4 mA $cm^{-2}$ (FIG. 5B), according to some embodiments.
Figure 5B:
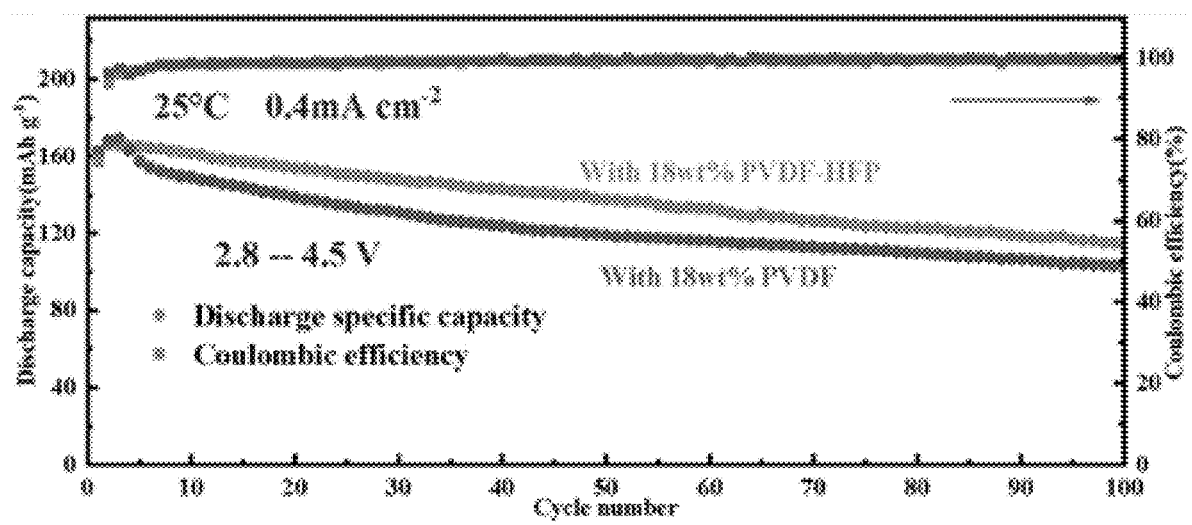

FIGS. 5A and 5B illustrate the cycling performance of solid batteries based on GCCs with a common (non-porous) cathode (Comparative Samples 1 and 2) at 0.1 mA cm$^{-2}$ (FIG. 5A) and with a porous cathode (Samples 3 and 4) at 0.4 mA cm$^{-2}$ (FIG. 5B), according to some embodiments. For both FIGS. 5A and 5B, cells are charged and discharged in the voltage range of 4.5V to 2.8V. Batteries based on the cathode of Comparative Samples 1 (10 wt % PVDF) and 2 (10 wt % PVDF-HFP) show poor electrochemical performance even at a low current density of 0.1 mA cm$^{-2}$ (FIG. 5A), with a sudden, rapid decay of the discharge capacity. For example, after just 50 cycles, discharge capacity decreases over 120 mAh g$^{-1}$ to less than 40 mAh g$^{-1}$ (i.e., capacity retention of at most 33%), depending on the polymer used. Batteries based on the porous cathode of Samples 3 (18 wt % PVDF) and 4 (18 wt % PVDF-HFP) show a greatly improved performance at a current density of 0.4 mA cm$^{-2}$ (FIG. 5B). The batteries comprising Samples 3 and 4, respectively, start with a similar initial discharge capacity of about 160 mAh g$^{-1}$ and after 100 cycles at 0.4 mA cm$^{-2}$, the cell with Sample 3 shows about a 60% capacity retention at room temperature while the cell with Sample 4 shows a greater than 70% capacity retention.

Thus, as presented herein, this disclosure relates to improved cathodes and methods of formation thereof for solid-state battery applications; more particularly, to gel composite cathode structures. In other words, the gel composite cathode structure comprises at least two layers: a first layer being a gel polymer electrolyte and a second layer being a porous gel polymer electrolyte/cathode material composite. Carbon fiber may be uniformly distributed in both the first and second layers. The gel polymer electrolyte layer allows the cathode to retain a close contact with the battery's solid electrolyte and thereby, a low interfacial resistance. The crosslinked polymer electrolyte and carbon fibers in the porous cathode bulk form a conductive matrix for both Li-ions and electrons.

Poly(vinylidene fluoride) (PVDF) and poly(vinylidene fluoride-hexafluoro propylene) (PVDF-HFP) were used as the binder polymer. When applying the polymer binder in a Li anode/garnet electrolyte cell, the gel composite cathode with 18 wt. % PVDF-HFP provided the lowest interfacial resistance of about 116 $\Omega cm^2$, with the corresponding cell exhibiting better cycling stability at greater than 70% capacity retention after 100 cycles at 0.4 mA cm$^{-2}$, comparing to the conventional cathode.

Advantages include a gel composite cathode which (1) greatly reduces cathode/SSE interfacial resistance (~116 $\Omega cm^2$); (2) restrains leakage of liquid electrolyte due to its integrated cathode material/gel electrolyte structure; (3) is highly lithium-ion and electronic conductive; (4) comprises cross-linked ion paths formed therein; (5) comprises an in-situ formed gel polymer electrolyte layer on a surface of cathode; and (6) improves cycling performance of solid state batteries comprising the gel composite cathode.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:
1. A battery, comprising:
a substrate;
a composite cathode disposed on the substrate;
a solid-state electrolyte disposed on the composite cathode; and
a lithium anode disposed on the solid-state electrolyte,
wherein the composite cathode comprises a gel polymer electrolyte layer and a porous cathode active material layer, and the solid-state electrolyte comprises at least one of:
(i) $Li_{7-3a}La_3Zr_2L_aO_{12}$ with L=Al, Ga or Fe and $0<a<0.33$;
(ii) $Li_7La_{3-b}Zr_2MbO_{12}$ with M=Bi or Y and $0<b<1$;
(iii) $Li_{7-c}La_3(Zr_{2-c}, N)O_{12}$, with N=In, Si, Ge, Sn, V, W, Te, Nb, or Ta and $0<c<1$;
or a combination thereof.

2. The battery of claim 1, wherein the porous cathode active material layer comprises at least one of $LiNi_dCo_eMn_{1-d-e}O_2$ (NCM) (with $0<d<1$, $0<e<1$), $LiT_MO_2$ (with TM=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3 \cdot (1-y)LiXO_2$ (with X=Ni, Co, or Mn and $0<y\leq1$), $LiNi_{0.8}Co_{0.15}Al_{0.05}O_2$ (NCA), $LiNi_{0.5}Mn_{1.5}O_4$, $LiFePO_4$, or combinations thereof.

3. The battery of claim 1, wherein the porous cathode active material layer comprises gel polymer electrolyte within its pores.

4. The battery of claim 1, wherein the gel polymer electrolyte layer has a thickness in a range of 0.01 μm to 50 μm.

5. The battery of claim 1, wherein the gel polymer electrolyte layer is in between the porous cathode active material layer and the solid-state electrolyte.

6. The battery of claim 5, wherein the gel polymer electrolyte layer is in contact with the solid-state electrolyte.

7. The battery of claim 1, wherein the porous cathode active material layer has a porosity of at least 50% and an average pore size diameter of at least 200 nm.

8. The battery of claim 1, wherein the gel polymer electrolyte layer comprises: poly(vinylidene fluoride) (PVDF), poly(vinylidene fluoride)-hexafluoropropylene (PVDF-HFP), polyacrylic acid (PAA), polyacrylonitrile (PAN), polymethyl methacrylate (PMMA), polyvinyl formal (PVFM), polyvinyl butyral (PVB), polyvinyl alcohol (PVA), or combinations thereof.

9. The battery of claim 1, wherein the porous cathode active material layer comprises at least one of: a conductive carbon component, an electronic conductive component, or combinations thereof.

10. The battery of claim 9, wherein the conductive carbon component and/or the electronic conductive component is independently selected from at least one of nanoparticles, nanowires, nanofibers, nanorods, nanotubes, nanospheres, graphene, carbon black, carbonized cotton fiber, vapor grown carbon fiber (VGCF), or combinations thereof.

11. The battery of claim 1, wherein the solid-state electrolyte comprises $Li_{6.5}La_3Zr_{1.5}Ta_{0.5}O_{12}$.

12. The battery of claim 1, wherein the solid-state electrolyte comprises at least one of: $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof.

13. The battery of claim 1, configured to exhibit at least one of:
a capacity retention of at least 50% after 100 cycles; or
a cathode/SSE interfacial resistance of no more than 500 $\Omega$ cm$^2$.

14. A method of forming a cathode for a solid-state battery, comprising:
mixing an active cathode material, at least one of a conductive carbon component and an electronic conductive component, and a polymer binder in dipolar aprotic organic solvent to form a slurry;
immersing the slurry in a non-solvent to form a porous disc structure by phase conversion; and
immersing the porous disc structure in a liquid electrolyte to form the cathode.

15. The battery of claim 1, wherein the porous cathode active material layer has a porosity of at least 70% and an average pore size diameter of at least 400 nm.

16. The method of claim 14, wherein the non-solvent comprises at least one of:
water, alcohol, methyl alcohol, isopropyl alcohol, glycerol, tetrahydrofuran (THF), or combinations thereof.

17. The method of claim 14, wherein the porous disc structure forms a porous cathode active material layer with a porosity of at least 50% and an average pore size diameter of at least 200 nm.

18. The method of claim 17, wherein the porosity is at least 70% and the average pore size diameter is at least 400 nm.

19. The method of claim 14, wherein the immersing the porous disc structure forms a gel polymer electrolyte, the porous disc structure forms a porous cathode active material layer, and the cathode comprise the gel polymer electrolyte within pores of the porous cathode active material layer.

20. The battery of claim 1, wherein the gel polymer electrolyte layer has a thickness in a range of 0.01 μm to 50 μm.

* * * * *

UNITED STATES PATENT AND TRADEMARK OFFICE
CERTIFICATE OF CORRECTION

PATENT NO. : 11,777,145 B2  
APPLICATION NO. : 17/356692  
DATED : October 3, 2023  
INVENTOR(S) : Michael Edward Badding et al.

Page 1 of 1

It is certified that error appears in the above-identified patent and that said Letters Patent is hereby corrected as shown below:

On the Title Page

In Column 1 item (60) (Prior Publication Data), Line 2, below "Dec. 30, 2021" insert -- Foreign Application Priority data Jun. 25, 2020 (CN) ........ 202010590245.X as a new field entry. --.

In the Claims

In Column 16, Line 32, in Claim 1, delete "$Li_7La_{3-b}Zr_2MbO_{12}$" and insert -- $Li_7La_{3-b}Zr_2M_bO_{12}$, --.

In Column 16, Line 33, in Claim 1, delete "$Li_{7-c}La_3(Zr_{2-c}, N)O_{12}$," and insert -- $Li_{7-c}La_3(Zr_{2-c}, N_c)O_{12}$, --.

Signed and Sealed this  
Twenty-second Day of October, 2024

Katherine Kelly Vidal  
*Director of the United States Patent and Trademark Office*